(12) United States Patent
Hirose

(10) Patent No.: US 7,723,616 B2
(45) Date of Patent: May 25, 2010

(54) SUPERCONDUCTING CABLE AND DC TRANSMISSION SYSTEM INCORPORATING THE SUPERCONDUCTING CABLE

(75) Inventor: Masayuki Hirose, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 278 days.

(21) Appl. No.: 11/795,515

(22) PCT Filed: Dec. 16, 2005

(86) PCT No.: PCT/JP2005/023180

§ 371 (c)(1),
(2), (4) Date: Jul. 18, 2007

(87) PCT Pub. No.: WO2006/098069

PCT Pub. Date: Sep. 21, 2006

(65) Prior Publication Data

US 2008/0257579 A1  Oct. 23, 2008

(30) Foreign Application Priority Data

Mar. 14, 2005  (JP)  ............................. 2005-072043

(51) Int. Cl.
*H01B 12/00* (2006.01)
(52) U.S. Cl. .................................. 174/125.1; 505/230
(58) Field of Classification Search .............. 174/15.4, 174/15.5, 125.1; 505/230–232
See application file for complete search history.

(56) References Cited

U.S. PATENT DOCUMENTS 3,461,218 A * 8/1969 Buchhold .................. 174/15.5
3,808,351 A * 4/1974 Moisson-Franckhauser et al. ......................... 174/15.5
5,932,523 A   8/1999 Fujikami et al.
2004/0171308 A1   9/2004 Hirose

FOREIGN PATENT DOCUMENTS

| CN | 1525494 | 9/2004 |
|---|---|---|
| JP | 2-299108 | 12/1990 |
| JP | 2003-249130 | 9/2003 |
| JP | 2004-227939 | 8/2004 |
| RU | 2 087 956 | 8/1997 |
| RU | 2 099 806 | 12/1997 |

* cited by examiner

*Primary Examiner*—Jeremy C Norris
(74) *Attorney, Agent, or Firm*—Drinker Biddle & Reath LLP

(57) ABSTRACT

The invention offers a superconducting cable easy to form a twisted structure even when a plurality of cable cores are used and a DC transmission system incorporating the superconducting cable. A superconducting cable 1 has a structure formed by twisting together two types of cable cores (two first cores 2 and one second core 3) having different structures and then housing them in a heat-insulated pipe 7. The first cores 2 each have a first superconducting layer 2*a*, to be used either as an outward line or for the transmission for a pole in DC transmission, and have no superconducting layer other than the first superconducting layer 2*a*. The second core 3 has a second superconducting layer 3*a*, to be used as a return line or neutral line in DC transmission, and has no superconducting layer other than the second superconducting layer 3*a*. The second superconducting layer 3*a* has an inner diameter larger than the outer diameter of the first superconducting layer 2*a*.

21 Claims, 5 Drawing Sheets

SUPERCONDUCTING CABLE AND DC TRANSMISSION SYSTEM INCORPORATING THE SUPERCONDUCTING CABLE

TECHNICAL FIELD

The present invention relates to a superconducting cable formed by twisting a plurality of cable cores together and to a DC transmission system incorporating the superconducting cable. The present invention particularly relates to a superconducting cable that allows easy formation of the twisted structure.

BACKGROUND ART

As an AC superconducting cable, a three-core-twisted-type cable is commonly known that is formed by twisting three cable cores together. FIG. 7 is a cross-sectional view of a three-core-twisted-type cable for the three-phase AC use. A superconducting cable 100 has a structure in which three cable cores 102 are twisted together and housed in a heat-insulated pipe 101. The heat-insulated pipe 101 has a dual-pipe structure composed of an outer pipe 101a and an inner pipe 101b, between which a heat-insulating material (not shown) is placed. The space between the outer pipe 101a and the inner pipe 101b is evacuated in vacuum. An anticorrosion covering 104 is provided on the outer circumference of the heat-insulated pipe 101. Each of the cable cores 102 comprises, from the center in the following order, a former 200, a superconducting conductor layer 201, an insulating layer 202, a superconducting shielding layer 203, and a protecting layer 204. A space 103 enclosed by the inner pipe 101b and the cable cores 102 forms a channel for a coolant such as liquid nitrogen.

When AC transmission is performed by using the above-described superconducting cable, not only is AC loss caused due to the inductance but also current at the time of the short circuiting is large, so that the temperature may rise excessively due to the loss at that moment. In contrast to the AC transmission, DC transmission using a superconducting cable not only eliminates the AC loss but also decreases the short circuit current. As a DC superconducting cable, Patent literature 1 has proposed a superconducting cable formed by twisting together three cable cores, each having a superconducting conductor and an insulating layer. In this superconducting cable, each of the cores comprises a superconducting conductor, an insulating layer provided on the outer circumference of the conductor, and a return conductor that is composed of superconducting wires provided on the outer circumference of the insulating layer. Unipolar transmission is performed by using the superconducting conductors as the outward line and the return conductors as a return line.

Patent literature 1: the published Japanese patent application Tokukai 2003-249130.

DISCLOSURE OF THE INVENTION

Problem to be Solved by the Invention

In the superconducting cable disclosed in the foregoing Patent literature 1, the use of one cable enables the DC transmission such as unipolar transmission and bipolar transmission. Because the superconducting cable has a structure formed by twisting a plurality of cable cores together, the cable can have an allowance for contraction when the cable is cooled. This cable, however, has cable cores each provided with the superconducting conductor and the return conductor both made of superconducting material. Consequently, each of the cores is produced by using large quantity of superconducting material. This increases the tendency to increase the flexural rigidity of the cores. As a result, it is rather difficult to twist the three cable cores together. Therefore, improvement of this property is required. In addition, in the case of the AC superconducting cable shown in FIG. 7, also, because the cable has cable cores each provided with the superconducting conductor and the superconducting shielding layer both made of superconducting material, it is rather difficult to twist the cores together.

In view of the above circumstance, a main object of the present invention is to offer a superconducting cable that allows easy formation of a twisted structure even when a plurality of cable cores are used. Another object of the present invention is to offer a superconducting cable suitable for the DC transmission. Yet another object is to offer a DC transmission system incorporating the above-described superconducting cable.

Means to Solve the Problem

The present invention attains the foregoing object by decreasing the quantity of the superconducting material used for the entire cable.

(Type Formed by Twisting Together Cable Cores Having Two Different Types in Structure: Type 1)

As a means to decrease the quantity of the superconducting material used for the entire cable, the present invention first proposes to decrease the quantity of the superconducting material used per cable core.

The present invention offers a superconducting cable formed by twisting together a plurality of cable cores, each having a superconducting layer and an insulating layer. The cable has a feature in that the cable comprises the following cores having the following structures:

(a) a first core, having a first superconducting layer; and (b) a second core, having a second superconducting layer that has an inner diameter larger than the outer diameter of the first superconducting layer.

The present invention proposes a DC transmission system that incorporates the Type 1 superconducting cable comprising the above-described first and second cores. The transmission system is described below.

(Unipolar Transmission)

The first superconducting layer provided in the first core is used as the outward line, and the second superconducting layer provided in the second core as the return line.

(Bipolar Transmission)

A plurality of first cores are provided. The first superconducting layer provided in at least one first core is used to perform the transmission for one pole; either the positive pole or the negative pole. The first superconducting layer provided in the remaining at least one first core is used to perform the transmission for the other pole. The second superconducting layer provided in the second core is used as the neutral line.

The present invention also proposes another embodiment different from the type of embodiment having the foregoing two different types of cable cores. The newly proposed embodiment has a structure that is formed by twisting together a core or cores each having a superconducting layer made of superconducting material and a member having no superconducting layer.

(Type Provided with a Coolant-Circulating Pipe: Type 2)

The present invention offers another superconducting cable formed by twisting a plurality of cable cores together. The cable has a feature in that the cable is formed by twisting together a coolant-circulating pipe having the same diameter as that of the cable core and two cable cores each having a structure comprising the following members:

(a) a superconducting conductor layer;

(b) an insulating layer provided on the outer circumference of the superconducting conductor layer; and (c) an outer superconducting layer provided on the outer circumference of the insulating layer.

The present invention also proposes another DC transmission system that incorporates the Type 2 superconducting cable formed by twisting together the above-described two cores and one coolant-circulating pipe. The transmission system is described below.

(Unipolar Transmission)

The superconducting conductor layers provided in both cores are used as the outward line, and the outer superconducting layers provided in both cores as the return line.

(Bipolar Transmission)

The superconducting conductor layer provided in one of the cores is used to perform the transmission for one pole; either the positive pole or the negative pole. The superconducting conductor layer provided in the other core is used to perform the transmission for the other pole. The outer superconducting layers provided in both cores are used as the neutral line.

In the AC superconducting cable shown in FIG. 7 described above and the DC superconducting cable described in Patent literature 1, a three-core-twisted structure is employed to secure an allowance for contraction when the cable is cooled. In addition, Patent literature 1 has proposed to perform a unipolar transmission by using a core that comprises a superconducting conductor and a return conductor both formed of a superconducting material. However, when a large quantity of superconducting material is used for the cable cores of a superconducting cable, the cores increase their flexural rigidity. As a result, it becomes rather difficult to perform three-core twisting. In view of this problem, the present invention proposes to decrease the quantity of the superconducting material used per cable core so that the twisting operation can be performed easily. More specifically, the following two types of cores are used:

(a) a core (corresponding to the first core) that has no outer superconducting layer and that has only a superconducting conductor layer as a superconducting layer; and (b) another core (corresponding to the second core) that has only an outer superconducting layer as a superconducting layer and that has no superconducting conductor layer (this core has a structure reversed from that of the foregoing core).

Here, the outer superconducting layer is a layer used as the return conductor in the DC transmission and used as the shield in the AC transmission, and the superconducting conductor layer is a layer used as the outward conductor in the DC transmission and used as the conductor in the AC transmission. Alternatively, the present invention proposes to facilitate the twisting operation by employing a structure in which one of the three cores is formed by a member that has no superconducting material at all. More specifically, a coolant-circulating pipe is used in place of one cable core. The present invention is explained in more detail below.

(Type 1)

A superconducting cable of the present invention is formed by twisting together at least one first core and at least one second core each comprising a superconducting layer and an insulating layer. The or each first core (hereinafter simply referred to as the first core) is provided with a first superconducting layer composed of a superconducting material without having another superconducting layer made of a superconducting material. The or each second core (hereinafter simply referred to as the second core) is provided with a second superconducting layer composed of a superconducting material without having another superconducting layer made of a superconducting material. More specifically, the first core has the superconducting layer at the center-portion side of the core and has no superconducting layer at the outer-circumference side of the core. The second core has the superconducting layer at the outer-circumference side of the core and has no superconducting layer at the center-portion side of the core. The second superconducting layer of the second core is formed such that it has an inner diameter larger than the outer diameter of the first superconducting layer.

It is recommended that the superconducting layer of the first and second cores be formed by helically winding tape-shaped wires having a structure in which a plurality of filaments made of, for example, a Bi-2223-based superconducting material are placed in a matrix such as a silver sheath. The superconducting layer may either be a single layer or be composed of multiple layers. When a multilayer structure is employed, an insulating layer may be provided between the constituent superconducting layers. The insulating layer between the constituent superconducting layers may be provided, for example, by helically lapping insulating paper, such as kraft paper, or semisynthetic insulating paper, such as PPLP (registered trademark, produced by Sumitomo Electric Industries, Ltd.) (PPLP is the abbreviation of polypropylene-laminated paper).

The first superconducting layer is formed by helically winding the foregoing wires made of a superconducting material on the outer circumference of a former. The former may either be a solid body or a hollow body formed by using a metallic material such as copper or aluminum. For example, it may have a structure in which a plurality of copper wires are stranded. As the copper wires, wires each having an insulating coating may be used. The former functions as a member for maintaining the shape of the first superconducting layer. A cushion layer may be provided between the former and the first superconducting layer. The cushion layer avoids the direct metallic contact between the former and the superconducting wires to prevent the superconducting wires from being damaged. In particular, when the former is formed by stranded wires, the cushion layer also functions to further smooth the surface of the former. As a specific material for the cushion layer, insulating paper or carbon paper can be suitably used.

The second superconducting layer is formed by helically winding wires made of the foregoing superconducting material on the outer circumference of a core member. It is recommended that the core member be formed by using a material that does not increase the rigidity of the second core, in comparison with the cable core comprising both the superconducting conductor layer and the outer superconducting layer. The core member may be formed either with an insulating material or with a conducting material (excluding a superconducting material). For example, it may be formed through any of the following methods:

(a) using an insulating material similar to the insulating layer-forming material, which is explained below;

(b) using a plastic material;
(c) stranding metal wires such as copper wires; and
(d) helically lapping an insulating material on the outer circumference of a plastic material or a stranded metallic wire.

As the above-described core member, a coolant-circulating pipe may be used. In this case, it is desirable to utilize the cable structure as follows:
(a) to use the space enclosed by the first and second cores and the below-described heat-insulated pipe as the outward channel of the coolant (coolant channel); and
(b) to use the coolant-circulating pipe for the core member as the return channel of the coolant.

When the second core has the coolant-circulating pipe at its center portion, the outward and return channels of the coolant can be provided in the heat-insulated pipe without allowing the presence of the coolant-circulating pipe to decrease the space enclosed by the first and second cores and the heat-insulated pipe. As a result, in the structure in which the coolant-circulating pipe is provided in the second core, the space enclosed by the first and second cores and the heat-insulated pipe can be secured sufficiently, in comparison with the structure in which a coolant-circulating pipe for the return channel is provided in the heat-insulated pipe separately from the cores. In other words, by sufficiently securing the outward coolant channel, the coolant can be sufficiently circulated in the outward coolant channel. The coolant-circulating circuit formed with the outward and return channels is equipped with a refrigerator for cooling the coolant, a pump for force-feeding the coolant, and the like. These machines determine the length of the circulating circuit (cooling section) in such a way that the coolant can be circulated at a proper temperature. As described above, for the structure in which the coolant can be sufficiently circulated in the outward coolant channel, the large flow rate of the coolant can further decrease the temperature rise in the coolant due to the intruding heat and other causes. Consequently, a coolant in a proper temperature condition can be transported over a long distance. As a result, one cooling section can be elongated. Furthermore, as described above, a sufficient space can be secured to circulate the coolant. Therefore, the circulating pressure of the coolant can be reduced, decreasing the pressure loss. This enables, for example, a decrease in the electric power for driving the pump.

It is desirable that the above-described coolant-circulating pipe not only be made of a metallic material having excellent strength even at the coolant temperature but also have a flexibility to such an extent that it can be twisted together with another member. The types of coolant-circulating pipe include, for example, a metallic pipe, a spiral steel tape, and a hollow body formed by helically winding metal wires, such as copper wires, on a spiral steel tape. A corrugated metallic pipe is desirable because it not only has excellent flexibility, thereby facilitating the twisting of it together with another member, but also easily contracts at the time the cable is cooled. When a coolant-circulating pipe made of metallic material is used, an insulating layer is formed on the outer circumference of the coolant-circulating pipe by using an insulating material. Then, the second superconducting layer is provided on the insulating layer. In particular, when a corrugated pipe is used, it is desirable that the insulating layer be provided on the corrugated pipe so that the surface on which the second superconducting layer is formed can become smooth.

In the first core, an insulating layer is provided on the outer circumference of the first superconducting layer. In the second core, an insulating layer is provided on the outer circumference of the second superconducting layer. These insulating layers may be formed by helically lapping semisynthetic insulating paper, such as PPLP (registered trademark), or insulating paper, such as kraft paper. The insulating layer provided in the first core is provided on the first superconducting layer so that the first superconducting layer can have an insulating strength needed to be insulated against the voltage to ground. The insulating layer provided in the second core is provided on the second superconducting layer so that the second superconducting layer can have an insulating strength needed to be insulated against the voltage to ground.

When a superconducting cable of the present invention is used for DC transmission, the above-described insulating layer may be structured with a $\rho$ (resistivity) grading to flatten the radial (thicknesswise) distribution of the DC electric field. The $\rho$ grading is performed such that as the radial position moves toward the innermost portion of the insulating layer, the resistivity decreases, and as the radial position moves toward the outermost portion, the resistivity increases. The performing of the $\rho$ grading varies the resistivity of the insulating layer thicknesswise in steps. This $\rho$ grading can flatten the thicknesswise distribution of the DC electric field throughout the insulating layer. As a result, the insulating thickness can be decreased. The number of layers each having a different resistivity is not particularly limited. Practically, however, two or three layers or so are employed. In particular, when the thicknesses of the individual layers are equalized, the flattening of the distribution of the DC electric field can be effectively performed.

To perform the $\rho$ grading, it is recommendable to use insulating materials having different resistivities ($\rho$'s). For example, when insulating paper, such as kraft paper, is used, the resistivity can be varied, for example, by varying the density of the kraft paper or by adding dicyandiamide to the kraft paper. When composite paper, such as PPLP (registered trademark), composed of insulating paper and plastic film is used, the resistivity can be varied either by varying the ratio, k, of the thickness, tp, of the plastic film to the total thickness, T, of the composite paper (the ratio, k, is expressed as (tp/T)× 100) or by varying the density, quality, additive, or the like of the insulating paper. It is desirable that the value of the ratio, k, lie in a range of 40% to 90% or so, for example. Usually, as the ratio, k, increases, the resistivity, $\rho$, increases.

In addition, when the insulating layer has, in the vicinity of the superconducting layer, a high $\in$ (dielectric constant) layer that has a dielectric constant higher than that of the other portion, not only can the DC voltage-withstanding property be improved but also the impulse voltage-withstanding property can be improved. The values of dielectric constant, $\in$, (at 20° C.) are summarized below:
(a) ordinary kraft paper: 3.2 to 4.5 or so
(b) composite paper with a ratio, k, of 40%:2.8 or so
(c) composite paper with a ratio, k, of 60%:2.6 or so
(d) composite paper with a ratio, k, of 80%:2.4 or so.

In particular, it is desirable to form the insulating layer by using composite paper that has a high ratio, k, and that incorporates kraft paper having a rather high air impermeability, because this structure is excellent in both DC and impulse withstand voltages.

In addition to the above-described $\rho$ grading, the insulating layer may be structured such that as its radial position moves toward the innermost portion, the dielectric constant, $\in$, increases, and as the radial position moves toward the outermost portion, the dielectric constant, $\in$, decreases. This $\in$ grading, also, is formed radially throughout the insulating layer. As described above, by the performing of the ρ grading, a superconducting cable of the present invention becomes a cable having excellent DC property, rendering itself suitable for DC transmission. On the other hand, at present, most of the transmission lines are structured as AC systems. In view of the future transition of transmission systems from AC to DC, it can be considered that before the transition to the DC transmission, there exists a case where the AC transmission is carried out by transiently using a cable of the present invention. For example, there will be a case in which although part of the cable in a transmission line is replaced with a superconducting cable of the present invention, the remaining portion is still composed of an AC transmission cable. Another case is conceivable in which although the AC transmission cable in a transmission line is replaced with a superconducting cable of the present invention, the power-transmitting apparatuses connected to the cable still remain for the AC use. In this case, first, AC transmission is transiently performed using the cable of the present invention, and then, finally, the transition to DC transmission will be performed. Therefore, it is desirable that a cable of the present invention not only have an excellent DC property but also be designed by considering the AC property. When the AC property, also, is taken into consideration, a cable having an excellent property against impulse voltage, such as surge voltage, can be structured by employing an insulating layer that increases its dielectric constant, ∈, as its radial position moves toward the innermost portion and decreases its dielectric constant, ∈, as its radial position moves toward the outermost portion. At a later time, when the foregoing transient period is finished to commence the DC transmission, the cable of the present invention used in the transient period can be used as the DC cable without any modification. In other words, a cable of the present invention structured not only by the ρ grading but also by the ∈ grading can be suitably used as an AC/DC cable.

Usually, the above-described PPLP (registered trademark) has a property such that when the ratio, k, is increased, the resistivity, ρ, is increased and the dielectric constant, ∈, is decreased. Consequently, when the insulating layer is structured in such a way that as the radial position moves toward the outermost portion, PPLP (registered trademark) having a higher ratio, k, is used, the insulating layer can have a property such that as the radial position moves toward the outermost portion, the resistivity, ρ, is increased and concurrently the dielectric constant, ∈, is decreased.

On the other hand, kraft paper generally has a property such that when the air impermeability is increased, the resistivity, ρ, is increased and the dielectric constant, ∈, is also increased. Consequently, when only kraft paper is used, it is difficult to structure the insulating layer in such a way that as the radial position moves toward the outermost portion, the resistivity, ρ, is increased and concurrently the dielectric constant, ∈, is decreased. Consequently, when kraft paper is used, it is desirable that the insulating layer be structured by combining with composite paper. For example, it is recommended that a kraft-paper layer be formed at the innermost portion of the insulating layer and that a PPLP layer be formed at the outer side of the kraft-paper layer. In this case, the PPLP layer has a resistivity, ρ, higher than that of the kraft-paper layer, and at the same time, the PPLP layer has a dielectric constant, ∈, lower than that of the kraft-paper layer.

In addition, a semiconducting layer may be formed between the first superconducting layer and the insulating layer and between the insulating layer and the second superconducting layer. When a semiconducting layer is formed in the above-described way, the superconducting layer is brought into increased contact with the insulating layer, so that the deterioration accompanying the generation of partial discharge or the like will be suppressed.

A superconducting cable of the present invention is a multicore cable formed by twisting together at least one first core and at least one second core, each having the above-described structure. The number of first cores and the number of second cores may either be the same or be different. Nevertheless, the number of first and second cores is adjusted such that the quantity of the Superconducting material used in the first superconducting layer of the first core is the same as that of the superconducting material used in the second superconducting layer of the second core. For example, when the employed number of first cores is larger than that of second cores, it is recommended that the quantity of the superconducting material used per second core be adjusted to be larger than that of the superconducting material used per first core. As described earlier, a cable of the present invention is provided with the first and second superconducting layers such that the inner diameter of the second superconducting layer is larger than the outer diameter of the first superconducting layer. Consequently, even when the number of first cores is predetermined to be larger than that of second cores so that the first cores, in total, use the same quantity of the superconducting material as the total quantity of the superconducting material of the at least one second core, the at least one second core is not required to have a second superconducting layer having an excessively increased thickness. Therefore, the flexural rigidity of the second core will not be excessively increased. When a unipolar transmission is performed, at least one first core and at least one second core are prepared, and they are twisted together. Thus, a superconducting cable having at least one first core and at least one second core is produced to be used for the transmission. When a bipolar transmission is performed in addition to the unipolar transmission, at least two first cores and one second core are prepared, and they are twisted together. Thus, a multicore superconducting cable having at least two first cores and one second core is produced to be used for the transmission. In this case, it is recommended that the first cores be used for the transmission for the individual poles and that the second core be used as the neutral line. It is desirable that these first cores and second core have the same diameter to facilitate the twisting operation.

It is recommended that the Type 1 superconducting cable comprising the foregoing first and second cores be structured such that the twisted first and second cores are housed in a heat-insulated pipe. The heat-insulated pipe may have a structure in which, for example, a dual-pipe structure is composed of an outer pipe and an inner pipe, a heat-insulating material is placed between the two pipes, and the space between the outer and inner pipes is evacuated in vacuum. In the inner pipe, the space enclosed by the outer surface of the first and second cores and the inner surface of the inner pipe is filled with a coolant, such as liquid nitrogen, for cooling the first and second cores. An anticorrosion covering may be provided on the outer circumference of the heat-insulated pipe by using a resin such as polyvinyl chloride. The matter concerning the heat-insulated pipe is also applied to the below-described Type 2 superconducting cable.

The above-described Type 1 superconducting cable has a structure in which a plurality of cores are twisted together. Consequently, as with the conventional superconducting cable having a three-core-twisted structure, the cable can have an allowance for contraction when the cable is cooled. To provide the allowance for contraction, the cores may be twisted together by giving a slack to the cores, for example. The slack can be given, for example, by twisting the cores together with a spacer placed between the neighboring cores and subsequently removing the spacer either when the twisted cores are housed in a previously formed heat-insulated pipe or when a heat-insulated pipe is formed on the outer circumference of the twisted cores. The spacer may be formed of, for example, a sheet of felt having a thickness of about 5 mm. It is recommendable to properly vary the thickness of the spacer according to the diameter of the cable core. The matter concerning the allowance for contraction is also applied to the below-described Type 2 superconducting cable.

The Type 1 superconducting cable having the above-described structure can be used for unipolar transmission by using the first superconducting layer of the first core as the outward line and the second superconducting layer of the second core as the return line.

Furthermore, the Type 1 superconducting cable having the above-described structure can be used for bipolar transmission by the following manner: A plurality of first cores are provided. The first superconducting layer provided in at least one first core is used to perform the transmission for one pole; either the positive pole or the negative pole. The first superconducting layer provided in the remaining at least one first core is used to perform the transmission for the other pole. The second superconducting layer provided in the second core is used as the neutral line. In addition, during the performing of the bipolar transmission, one pole may suffer an abnormal condition in the first superconducting layer for the pole or in the DC-AC converter connected to the cable, for example. In this case, when the pole is required to stop the power transmission due to this abnormality, the first and second cores for the other pole, which is sound, can be used to carry out unipolar transmission. More specifically, the first superconducting layer of the first core can be used as the outward line and the second superconducting layer of the second core as the return line.

In either of the transmission systems, whether unipolar or bipolar transmission, the second superconducting layer is placed at the ground potential. When bipolar transmission is performed, usually, the positive-pole current and the negative-pole current have nearly the same magnitude and cancel out to each other. Consequently, the second superconducting layer, which functions as the neutral line, is almost free from voltage application. However, when an imbalance occurs between the positive and negative poles, the imbalanced current flows through the second superconducting layer. In addition, when the bipolar transmission is switched to the unipolar transmission due to an abnormal condition in one pole, a current comparable to the transmission current will flow through the second superconducting layer because the second superconducting layer is used to act as the return line of the unipolar transmission. In view of these circumstances, in the present invention, the second superconducting layer is placed at the ground potential.

A superconducting cable of the present invention provided with the first and second cores can be suitably used not only for DC transmission but also for AC transmission by providing an insulating layer structured with the ∈ grading, as described above. When AC transmission is performed, the first and second cores have no conductor portion that functions as a shield. Therefore, if the superconducting cable is used for high-voltage transmission, the leakage electric field may become great. Consequently, when the superconducting cable is used for AC transmission, it is desirable to use the cable for low-voltage transmission. In addition, when single-phase AC transmission is performed, it is recommendable to use a superconducting cable provided with one first core and one second core that are twisted together. In this case, the superconducting layers of both cores may be used for the power transmission for the phase. Alternatively, the superconducting layer of either one of the cores may be used for the power transmission for the phase with the remaining core being used as the spare core. When this superconducting cable is used for DC transmission after being used for single-phase AC transmission, the cable can be used for unipolar transmission. On the other hand, three-phase AC transmission is performed by using a superconducting cable provided with at least three cores that are composed of a combination of the first and second cores. If more than three cores are used, the redundant core or cores can be used as the spare. When this superconducting cable is used for DC transmission after being used for three-phase AC transmission, the cable can be used either for unipolar transmission or for bipolar transmission. Alternatively, three-phase AC transmission may be performed by using two or three superconducting cables each provided with one first core and one second core that are twisted together so that at least three cores can be provided in total. In this case, when two cables are used, the total number of cores is four. Consequently, one core can be used as the spare core. When three cables are used, it is recommended that an individual cable be used for transmitting the power for the individual phase. In other words, it is recommended that two cores be used to transmit the power for one phase.

(Type 2)

The Type 2 superconducting cable of the present invention has a three-core-twisted structure in which two cable cores and one coolant-circulating pipe are twisted together. The individual cable core is provided with the following members in this order from the center:

(a) a superconducting conductor layer structured with superconducting material;

(b) an insulating layer structured with insulating material; and (c) an outer superconducting layer structured with superconducting material.

The superconducting conductor layer may be formed by helically winding wires made of Bi-2223-based superconducting material, as with the earlier-described first superconducting layer of the first core and the second superconducting layer of the second core. In addition, as with the earlier-described first superconducting layer of the first core and the second superconducting layer of the second core, the superconducting conductor layer may either be a single layer or be composed of multiple layers. As with the first superconducting layer of the first core, the superconducting conductor layer is formed on the outer circumference of the former.

The insulating layer may be formed by helically lapping semisynthetic insulating paper, kraft paper, or the like on the foregoing superconducting conductor layer as with the above-described insulating layer of the first core. The insulating layer is designed so as to have an insulating strength needed for the insulation between the superconducting conductor layer and the ground. In addition, as with the above-described insulating layer of the first and second cores, the insulating layer may be structured with the $\rho$ grading to flatten the thicknesswise distribution of the DC electric field throughout the insulating layer. The $\rho$ grading is performed such that as the radial position moves toward the innermost portion, the resistivity decreases, and as the radial position moves toward the outermost portion, the resistivity increases. Furthermore, as with the above-described insulating layer of the first and second cores, the insulating layer may have, in the vicinity of the superconducting conductor layer, a high ∈ layer that has a dielectric constant higher than that of the other portion. By being provided with the foregoing $\rho$ grading and high $\in$ layer, the cable can be a superconducting cable more suitable for DC transmission. In addition, as with the above-described insulating layer of the first and second cores, the insulating layer may be structured, in addition to the $\rho$ grading, in such a way that as its radial position moves toward the innermost portion, the dielectric constant, $\in$, increases, and as the radial position moves toward the outermost portion, the dielectric constant, $\in$, decreases. When this structure is employed, the cable can be a superconducting cable more suitable for both DC and AC transmissions.

As with the superconducting conductor layer, the outer superconducting layer is formed on the outer circumference of the insulating layer by using a superconducting material. The outer superconducting layer may be formed by using a material similar to that used for forming the superconducting conductor layer. The outer superconducting layer is placed at the ground potential. When the Type 2 superconducting cable is used to perform bipolar transmission, usually, the positive-pole current and the negative-pole current have nearly the same magnitude and cancel out to each other. Consequently, the outer superconducting layer, which functions as the neutral line, is almost free from voltage application. However, when an imbalance occurs between the positive and negative poles, the imbalanced current flows through the outer superconducting layer. In addition, when the bipolar transmission is switched to the unipolar transmission due to an abnormal condition in one pole, a current comparable to the transmission current will flow through the outer superconducting layer because the outer superconducting layer is used to act as the return line of the unipolar transmission. In view of these circumstances, in the present invention, the outer superconducting layer is formed with a superconducting material. It is desirable that a protecting layer acting also as an insulating layer be provided on the outer circumference of the outer superconducting layer.

In addition, a semiconducting layer may be formed at the inner circumference, the outer circumference, or both of the insulating layer. More specifically, it may be formed between the superconducting conductor layer and the insulating layer, between the insulating layer and the outer superconducting layer, or both. When the inner semiconducting layer, which is the former, or the outer semiconducting layer, which is the latter, is formed, the superconducting conductor layer or the outer superconducting layer is brought into increased contact with the insulating layer. As a result, the deterioration accompanying the generation of partial discharge or the like will be suppressed.

The coolant-circulating pipe twisted together with the foregoing two cable cores is used as the return channel of the coolant while the space enclosed by the two cores, the coolant-circulating pipe, and the heat-insulated pipe is used as the outward channel of the coolant (coolant channel). It is desirable that the above-described coolant-circulating pipe be, as with the coolant-circulating pipe provided in the foregoing second core, not only made of a metallic material having excellent strength even at the coolant temperature but also flexible to such an extent that it can be twisted together with another member. In particular, it is desirable that the coolant-circulating pipe have a shape excellent in flexibility. More specifically, it is desirable to use a corrugated metallic pipe. Because the corrugated pipe can expand and contract without much difficulty, it can absorb the amount of thermal contraction with its own expanding-and-contracting property even when no slack is provided at the time of the twisting together with the two cable cores (the slack is to be used as an allowance for contraction when the cable is cooled). In other words, in the case where the corrugated pipe is used as the coolant-circulating pipe, even when the corrugated pipe is twisted together with the cores without providing the above-described slack, the corrugated pipe can respond sufficiently to the contraction at the time the cable is cooled. Furthermore, in the present invention, the coolant-circulating pipe has the same outer diameter as that of the cores so that not only can the coolant-circulating pipe secure a sufficient size as the return channel of the coolant but also the twisted structure with the two cable cores can be formed with stability. The Type 2 superconducting cable is structured by housing the body formed by twisting together the two cable cores and the coolant-circulating pipe in the above-described heat-insulated pipe.

In the case where a metallic pipe is used as the foregoing coolant-circulating pipe, the heat-insulated pipe or the coolant-circulating pipe may be damaged when the coolant-circulating pipe is brought into physical contact with the heat-insulated pipe at the time the assembled body formed by twisting together the two cable cores and the coolant-circulating pipe is housed in the heat-insulated pipe (inner pipe). Moreover, metallic powders may also be produced at the same time. The metallic powders may be carried to the sealing end of the cable by the circulation of the coolant, creating electrical problems there. To solve this problem, a protecting layer may be provided on the outer circumference of the coolant-circulating pipe to prevent it from being brought into contact with the heat-insulated pipe so that the problem caused by the contact with the heat-insulated pipe can be avoided. The protecting layer may be formed by helically lapping kraft paper, for example.

The Type 2 superconducting cable having the above-described structure can be used for unipolar transmission by using the following arrangements:
 (a) the superconducting conductor layers provided in both cores are used as the outward line; and
 (b) the outer superconducting layers provided in both cores are used as the return line.

In addition, the cable can also be used for bipolar transmission by using the following arrangements:
 (a) the superconducting conductor layer provided in one of the cores is used to perform the transmission for one pole; either the positive pole or the negative pole;
 (b) the superconducting conductor layer provided in the other core is used to perform the transmission for the other pole; and
 (c) the outer superconducting layers provided in the individual cores are used as the neutral line.

Furthermore, during the performing of the bipolar transmission, one pole may suffer an abnormal condition in the superconducting conductor layer for the pole or in the DC-AC converter connected to the cable, for example. In this case, when the pole is required to stop the power transmission due to this abnormality, the core for the other pole, which is sound, can be used to carry out unipolar transmission. More specifically, the superconducting conductor layer of the core for the sound pole can be used as the outward line and the outer superconducting layer of the same core as the return line. In either of the transmission systems, whether unipolar or bipolar transmission, the outer superconducting layers of both cores are placed at the ground potential.

The Type 2 superconducting cable of the present invention can be suitably used not only for DC transmission but also for AC transmission by providing an insulating layer structured with the $\in$ grading, as described above. When single-phase AC transmission is performed, one Type 2 superconducting cable may be used. In this case, the superconducting conductor layers of the individual cores may be used for the power transmission for the phase with the outer superconducting layers of the individual cores being used as the shield layers. Alternatively, the superconducting conductor layer of either one of the cores may be used for the power transmission for the phase with the outer superconducting layer of the same core being used as the shield layer and with the remaining core being used as the spare core. On the other hand, when three-phase AC transmission is performed, two or three Type 2 superconducting cables are prepared so that the total number of cores can become at least three. When two cables are used, the total number of cores becomes four. Consequently, it is recommended that one core be used as the spare core, that the superconducting conductor layers of the remaining three cores be used for the transmission for the individual phases, and that the outer superconducting layers provided at the outer side of the superconducting conductor layers be used as the shield layers. When three cables are used, it is recommended that the superconducting conductor layers of the individual cables be used for the transmission for the individual phases and that the outer superconducting layers provided at the outer side of these superconducting conductor layers be used as the shield layers. In other words, it is recommended that two cores be used for the transmission for one phase.

EFFECT OF THE INVENTION

A superconducting cable of the present invention having the above-described structure achieves the specific effect of easily forming a twisted structure. This effect is achieved by decreasing the quantity of the superconducting material used per cable core to reduce the flexural rigidity and by using a member (which is the coolant-circulating pipe) formed without using a superconducting material to facilitate the twisting operation.

In particular, in the Type 1 superconducting cable formed by twisting together two different types of cores, when a second core containing a coolant-circulating pipe is used, the return channel of the coolant can be formed by sufficiently securing the space enclosed by the cores and the heat-insulated pipe. On the other hand, in the Type 2 superconducting cable formed by twisting together two cores and a coolant-circulating pipe, by providing the coolant-circulating pipe in place of one core, a channel having a maximal cross-sectional area can be secured as the return channel of the coolant. Moreover, by providing a protecting layer on the outer circumference of the coolant-circulating pipe, the coolant-circulating pipe can be prevented from being brought into contact with the heat-insulated pipe. As a result, the damaging of the coolant-circulating pipe and heat-insulated pipe, the production of metallic powders, and other problems resulting from this contact can be suppressed.

In addition, in the core provided in a superconducting cable of the present invention, by performing the $\rho$ grading in the insulating layer, the thicknesswise distribution of the DC electric field can be flattened throughout the insulating layer. As a result, the DC voltage-withstanding property is improved, and consequently the thickness of the insulating layer can be decreased. In addition to the $\rho$ grading, by providing an insulating layer having high $\in$ in the vicinity of the superconducting layer to be used as the conductor, the impulse voltage-withstanding property can also be improved in addition to the above-described improvement in the DC voltage-withstanding property. In particular, by structuring the insulating layer in such a way that as its radial position moves toward the innermost portion, the $\in$ increases, and as the radial position moves toward the outermost portion, the $\in$ decreases, a superconducting cable of the present invention can be a cable also having an excellent AC electric property. Therefore, a superconducting cable of the present invention can not only be suitably used for both of the DC transmission and AC transmission but also be suitably used during a transient period in which the transmission system is switched between AC and DC.

BEST MODE FOR CARRYING OUT THE INVENTION

Embodiments of the present invention are explained below. First, an explanation is given to the Type 1 superconducting cable of the present invention formed by twisting together two types of cores having different structures.

Example 1

FIG. 1 is a schematic configuration diagram showing a state in which a DC transmission line for unipolar transmission is constructed by using a superconducting cable of the present invention. In the following drawing, the same sign indicates the same item. A superconducting cable 1 is formed by twisting together two types of cores (two first cores 2 and one second core 3) having different structures and then housing the twisted cores in a heat-insulated pipe 7. More specifically, the first cores 2 are each provided with a first superconducting layer 2a composed of a superconducting material at the inner-circumference side of an insulating layer 4 and is not provided with a layer composed of a superconducting material at the outer-circumference side of the insulating layer 4. The second core 3 is provided with a core member 5b at the center-portion side, is provided with a second superconducting layer 3a composed of a superconducting material at the outer-circumference side of the core member 5b, and is not provided with a layer composed of a superconducting material at the center-portion side of the core member 5b. The second superconducting layer 3a is formed such that it has an inner diameter larger than the outer diameter of the first superconducting layer 2a.

(First Cores 2)

In this example, the first superconducting layer 2a was structured by using Bi-2223-based superconducting tape-shaped wires (Ag—Mn-sheathed tape-shaped wires) and was formed by helically winding the tape-shaped wires in multiple layers on the outer circumference of a former 5a. The former 5a was formed by stranding a plurality of copper wires. A cushion layer (not shown) made of insulating paper was formed between the former 5a and the first superconducting layer 2a. The insulating layer 4 was formed on the outer circumference of the first superconducting layer 2a. The insulating layer 4 was constituted by helically lapping semisynthetic insulating paper (PPLP: registered trademark, produced by Sumitomo Electric Industries, Ltd.) so as to have an insulating strength needed to insulate between the first superconducting layer 2a and the ground. In this example, two first cores 2 as described above were prepared. In addition, both first cores 2 were designed to have the same diameter.

(Second Core 3)

In this example, one second core 3 was used. The second core 3 was formed so as to have the same diameter as that of the foregoing first cores 2. First, the core member 5b was formed. In this example, the core member 5b was constituted by helically lapping semisynthetic insulating paper (PPLP: registered trademark, produced by Sumitomo Electric Industries, Ltd.) on the outer circumference of an inner core member (not shown) formed by stranding copper wires. The second superconducting layer 3a was provided on the outer circumference of the core member 5b. The second superconducting layer 3a was constituted by using the same superconducting material (Bi-2223-based superconducting tape-shaped wires (Ag—Mn-sheathed tape-shaped wires)) as used for the foregoing first superconducting layer 2a of the first cores 2. As with the first superconducting layer 2a, the second superconducting layer 3a was formed by helically winding the tape-shaped wires in multiple layers. The quantity of the tape-shaped wires used for the formation of the second superconducting layer 3a was predetermined to be the same as the total quantity of the tape-shaped wires used for the formation of the first superconducting layers 2a of the foregoing two first cores 2. In the second core 3, the size of the core member 5b was adjusted such that the second superconducting layer 3a of the second core 3 had an inner diameter (which is equal to the outer diameter of the core member 5b) larger than the outer diameter of the first superconducting layer 2a of the first cores 2 (the foregoing outer diameter is equal to the inner diameter of the insulating layer 4). This enabled the formation of the second superconducting layer 3a without excessively increasing the number of windings (consequently, the number of winding layers) of the superconducting tape-shaped wires. As a result, the flexural rigidity of the second core 3 was not increased excessively. An insulating layer 6 was provided on the outer circumference of the second superconducting layer 3a. The insulating layer 6 was formed by helically lapping kraft paper so as to have an insulating strength needed to insulate between the second superconducting layer 3a and the ground.

(Superconducting Cable 1)

The superconducting cable 1 was formed by twisting together two first cores 2 and one second core 3 and then housing the twisted cores in the heat-insulated pipe 7. Here, the first cores 2 each had only the first superconducting layer 2a as the layer composed of a superconducting material, and the second core 3 had only the second superconducting layer 3a as the layer composed of a superconducting material. In this example, the three cores composed of two cores 2 and one core 3 were twisted together so as to have a slack so that they could have an allowance for contraction when thermal contraction was created due to the cooling by the coolant. More specifically, the twisting operation was performed by placing a spacer (not shown) between the two first cores 2, between a first core 2 and the second core 3, and between the second core 3 and the other first core 2. The spacer was removed at the time the twisted body was housed in the heat-insulated pipe 7 (or at the time the heat-insulated pipe 7 was formed on the twisted body). Thus, the twisted body was housed in the heat-insulated pipe 7 in a state where it had a slack. In this example, the spacer was formed of a sheet of felt having a thickness of 5 mm with a rectangular cross section. In addition, in this example, the heat-insulated pipe 7 was formed of corrugated stainless steel pipe. As with the conventional superconducting cable shown in FIG. 7, the heat-insulated pipe 7 had a dual-pipe structure composed of an outer pipe 7a and an inner pipe 7b, between which a heat-insulating material (not shown) was placed in multiple layers. The space between the dual pipes was evacuated in vacuum. Thus, the heat-insulated pipe 7 had an evacuated multilayer heat-insulated structure. A space 8 enclosed by the inner pipe 7b and the three cores composed of two cores 2 and one core 3 form a channel for a coolant such as liquid nitrogen. An anticorrosion covering (not shown) made of polyvinyl chloride was formed on the outer circumference of the heat-insulated pipe 7.

The superconducting cable 1 of the present invention having the above-described structure can be used for DC transmission, more specifically, whether bipolar transmission or unipolar transmission. First, the case where the unipolar transmission is performed is explained. To perform the unipolar transmission, it is recommendable to construct a transmission line as shown in FIG. 1. More specifically, one end of the first superconducting layer 2a provided in one of the first cores 2 is connected to a DC-AC converter 10a, which is connected to an AC system (not shown), through a lead 20 and a lead 21. The other end of the same first superconducting layer 2a is connected to a DC-AC converter 10b, which is connected to an AC system (not shown), through a lead 22. Similarly, one end of the first superconducting layer 2a provided in the other first core 2 is connected to the DC-AC converter 10a through a lead 23 and the lead 21. The other end of the same first superconducting layer 2a is connected to the DC-AC converter 10b through the lead 22. On the other hand, one end of the second superconducting layer 3a provided in the second core 3 is connected to the DC-AC converter 10a through a lead 24. The other end of the second superconducting layer 3a is connected to the DC-AC converter 10b through a lead 25. The lead 24 is grounded. This grounding places the second superconducting layer 3a at the ground potential. In this example, a single-end grounding is employed. Nevertheless, a both-end grounding may be employed by grounding the lead 25 also. The leads 20 to 25 electrically connect the superconducting layers 2a and 3a with the DC-AC converters 10a and 10b.

A DC transmission line provided with the foregoing configuration can be used to perform a unipolar transmission by using the first superconducting layers 2a provided in the two first cores 2 as the outward line, which carries the unipolar current, and by using the second superconducting layer 3a provided in the second core 3 as the return line, which carries the return current. In addition, the superconducting cable 1 is formed by twisting together three cores with a slack provided. Consequently, the slack can absorb the amount of thermal contraction of the cores at the time of the cooling. Furthermore, the superconducting cable 1 uses a small quantity of the superconducting material per core in comparison with the conventional superconducting cable that is formed by twisting together three cable cores each provided with two layers composed of superconducting material (the superconducting conductor and outer superconducting layer). Therefore, the core of the present invention has small flexural rigidity, and consequently the twisted structure is easily formed.

Example 2

Next, the case where a bipolar transmission is performed is explained. FIG. 2(A) is a schematic configuration diagram showing a state in which a DC transmission line for bipolar transmission is constructed by using a superconducting cable of the present invention. FIG. 2(B) is a schematic configuration diagram showing a state in which a DC transmission line for unipolar transmission is constructed by using one first core of the two first cores and the second core. The superconducting cable 1 used in Example 1 can also be used for bipolar transmission. To perform the bipolar transmission, it is recommendable to construct a transmission line as shown in FIG. 2(A). More specifically, one end of the first superconducting layer 2a provided in one of the two first cores 2 (in FIG. 2(A), the first core 2 at the top) is connected to a DC-AC converter 11a, which is connected to an AC system (not shown), through a lead 30. The other end of the same first superconducting layer 2a is connected to a DC-AC converter 11*b*, which is connected to an AC system (not shown), through a lead 31. Similarly, one end of the first superconducting layer 2*a* provided in the other first core 2 (in FIG. 2(A), the first core 2 at the left) is connected to a DC-AC converter 12*a*, which is connected to an AC system (not shown), through a lead 32. The other end of the same first superconducting layer 2*a* is connected to a DC-AC converter 12*b*, which is connected to an AC system (not shown), through a lead 33. On the other hand, one end of the second superconducting layer 3*a* provided in the second core 3 is connected to the DC-AC converters 11*a* and 12*a* through a lead 34. The other end of the second superconducting layer 3*a* is connected to the DC-AC converters 11*b* and 12*b* through a lead 35. The lead 34 is grounded. This grounding places the second superconducting layer 3*a* at the ground potential. In this example, a single-end grounding is employed by grounding only the lead 34. Nevertheless, a both-end grounding may be employed by grounding the lead 35 also. The leads 30 to 35 electrically connect the superconducting layers 2*a* and 3*a* with the DC-AC converters 11*a*, 11*b*, 12*a*, and 12*b*.

The above-described configuration makes up a positive-pole circuit in the forward direction composed of the DC-AC converter 11*b*, the lead 31, the first superconducting layer 2*a* of the first core 2 at the top in FIG. 2(A), the lead 30, the DC-AC converter 11*a*, the lead 34, the second superconducting layer 3*a* of the second core 3, and the lead 35. On the other hand, the configuration also makes up a negative-pole circuit in the forward direction composed of the DC-AC converter 12*b*, the lead 33, the first superconducting layer 2*a* of the first core 2 at the left in FIG. 2(A), the lead 32, the DC-AC converter 12*a*, the lead 34, the second superconducting layer 3*a* of the second core 3, and the lead 35. The positive- and negative-pole circuits enable the performing of the bipolar transmission. In this configuration, the second superconducting layer 3*a* of the second core 3 is used not only as the neutral line but also to circulate an imbalanced current between the positive and negative poles or an abnormal current. In this example, in FIG. 2(A), the first core 2 at the top is used for the positive pole and the first core 2 at the left for the negative pole. Nevertheless, the usage may be reversed, of course.

Even when one of the poles stops the power transmission due to an abnormality in the first superconducting layer or DC-AC converter for the pole, a unipolar transmission can be performed by using the first superconducting layer for the sound pole. For example, in FIG. 2(A), when the first core 2 at the left, the DC-AC converters 12*a* and 12*b*, or the like creates an abnormal condition, i.e., when the negative pole creates an abnormal condition, the transmission using the first core 2 at the left in FIG. 2(A) is stopped. In this case, as shown in FIG. 2(B), a transmission line for a unipolar transmission can be formed by using the other first core 2 (the first core 2 at the top in FIG. 2 (A)). More specifically, the unipolar transmission can be performed by using the first superconducting layer 2*a* of this first core 2 as the outward line and using the second superconducting layer 3*a* of the second core 3 as the return line. In this example, the case where the negative pole creates an abnormality is explained. Nevertheless, when the positive pole creates an abnormality, also, a similar step can be taken. In this case, the unipolar transmission can be performed by using the first superconducting layer 2*a* of the other first core 2 (the first core 2 at the left in FIG. 2 (A)) as the outward line and using the second superconducting layer 3*a* of the second core 3 as the return line.

As explained above, a superconducting cable of the present invention can be used for both the bipolar transmission and unipolar transmission.

As described earlier, for performing DC transmission, when the insulating layer 4 of the first cores 2 and the insulating layer 6 of the second cores 3 are structured with the ρ grading such that as the radial position moves toward the innermost portion of the insulating layer, the resistivity decreases, and as the radial position moves toward the outermost portion, the resistivity increases, the distribution of the DC electric field can be flattened thicknesswise in the insulating layer. The resistivity can be varied by using different groups of PPLP (registered trademark), the different groups each having a different ratio, k. As the ratio, k, increases, the resistivity tends to increase. In addition, when the insulating layer 4 is provided with a high ∈ layer in the vicinity of the first superconducting layer 2*a*, its impulse voltage-withstanding property can be improved in addition to the improvement in the DC voltage-withstanding property. The high ∈ layer can be formed by using PPLP (registered trademark) having a low ratio, k, for example. In this case, the high ∈ layer becomes to be a low ρ layer also. Furthermore, in addition to the above-described ρ grading, when the insulating layers 4 and 6 are formed such that as the radial position moves toward the innermost portion, the dielectric constant, ∈, increases, and as the radial position moves toward the outermost portion, the dielectric constant, ∈, decreases, the insulating layers also have excellent AC property. Therefore, the superconducting cable 1 can also be suitably used for AC transmission. For example, by using different groups of PPLP (registered trademark), the different groups each having a different ratio, k, as follows, an insulating layer can be formed that has three different steps of resistivity and dielectric constant. It is recommended that the following three layers be provided in the following order from inside (X and Y each represent a constant):

A low ρ layer: ratio (k): 60%, resistivity (ρ) (at 20° C.): X Ω·cm, dielectric constant (∈): Y;

A middle ρ layer: ratio (k) 70%, resistivity (ρ) (at 20° C.): about 1.2X Ω·cm, dielectric constant (∈): about 0.95Y; and A high ρ layer: ratio (k): 80%, resistivity (ρ) (at 20° C.): about 1.4X Ω·cm, dielectric constant (∈): about 0.9Y.

When the superconducting cable 1 is used for three-phase AC transmission, it is recommendable to use the superconducting layers 2*a* and 3*a* in the individual cores 2 and 3 for the transmission for the individual phases. When the superconducting cable 1 is used for single-phase AC transmission, it is recommendable to use the superconducting layers 2*a* and 3*a* in the individual cores 2 and 3 for the transmission for the same phase. The individual cores 2 and 3 have no superconducting layer for functioning as a shield. Therefore, when the superconducting cable 1 is used for AC transmission, it is recommendable to use it for low-voltage transmission.

The superconducting cable 1 can be used for DC transmission, such as the above-described unipolar transmission and bipolar transmission, after being used for the above-described AC transmission. As described above, a superconducting cable of the present invention having an insulating layer structured by the ρ grading and ∈ grading can be suitably used as a DC/AC cable. The matter concerning the ρ grading and ∈ grading is also applied to the below-described Example 3.

Example 3

In the above-described Examples 1 and 2, an explanation is given to the structure in which a stranded copper wire is used as the core member of the second core. However, a coolant-circulating pipe may be used as the core member. FIG. 3 is a schematic cross-sectional view showing a superconducting cable of the present invention that is provided with a coolant-circulating pipe at the inside of the second superconducting layer of the second core. The second core 3 shown in this example has the same basic structure as that shown in Examples 1 and 2. Only the different point is that a coolant-circulating pipe 9a is provided as an inner core member of the core member 5b. An explanation is given below by focusing on this point.

In this example, the coolant-circulating pipe 9a was formed with a corrugated stainless steel pipe. An insulating layer 9b was formed on the outer circumference of the coolant-circulating pipe 9a by helically lapping semisynthetic insulating layer. In this example, in particular, the semisynthetic insulating layer was lapped so as to conceal the shape of the corrugated pipe formed by the peak and trough so that the layer can have a uniform insulating thickness to the second superconducting layer 3a. Thus, the insulating layer 9b was provided so as to have a smooth outer circumferential surface. As with Example 1, the second superconducting layer 3a was provided on the outer circumference of the insulating layer 9b, and successively an insulating layer 6 was provided on the outer circumference of the second superconducting layer 3a. Thus, the second core 3 was formed so as to have the same diameter as that of the first cores 2.

By using the second core 3 provided with the foregoing coolant-circulating pipe 9a, the space 8 enclosed by the inner pipe 7b and three cores composed of two cores 2 and one core 3 can be used as the outward channel of the coolant, such as liquid nitrogen, and the coolant-circulating pipe 9a can be used as the return channel of the coolant. In particular, because the coolant-circulating pipe 9a is placed in the second core 3, the return channel of the coolant can be provided without decreasing the cross-sectional area of the space 8, in comparison with the case where the coolant-circulating pipe 9a is placed in the space 8, which lies at the outside of the second core 3. In addition, this example uses a corrugated pipe, which has excellent flexural rigidity, as the coolant-circulating pipe 9a. This not only facilitates the operation for twisting together with the first cores 2 but also allows the coolant-circulating pipe 9a itself to easily contract at the time the cable is cooled. As described above, the core member 5b provided at the inside of the second superconducting layer 3a may be formed with different materials (in this example, the coolant-circulating pipe 9a and the insulating layer 9b).

Next, an explanation is given to the Type 2 superconducting cable of the present invention, which is formed by twisting together two cable cores and one coolant-circulating pipe.

Example 4

FIG. 4 is a schematic configuration diagram showing a state in which a DC transmission line for unipolar transmission is constructed by using a superconducting cable of the present invention. In FIG. 4 and below-described FIGS. 5 (A) and 5 (B), the coolant-circulating circuit is omitted. A superconducting cable 40 is a cable formed by twisting together two cable cores 41, each of which is provided with a superconducting conductor layer 44 and a coaxially placed outer superconducting layer 46 both made of a superconducting material, and one coolant-circulating pipe 42 and then by housing the twisted body in a heat-insulated pipe 7. Each of the cable cores 41 is provided with a former 43, the superconducting conductor layer 44, an insulating layer 45, the outer superconducting layer 46, and a protecting layer 47 in this order from the center.

(Cable Cores 41)

In this example, the superconducting conductor layer 44 and the outer superconducting layer 46 were formed by using Bi-2223-based superconducting tape-shaped wires (Ag—Mn-sheathed tape-shaped wires). The superconducting conductor layer 44 was structured by helically winding the foregoing superconducting tape-shaped wires in multiple layers on the outer circumference of the former 43. The outer superconducting layer 46 was structured by the same method as above on the insulating layer 45. The former 43 was formed by stranding a plurality of copper wires. A cushion layer (not shown) made of insulating paper was formed between the former 43 and the superconducting conductor layer 44. The insulating layer 45 was structured on the outer circumference of the superconducting conductor layer 44 by helically lapping semisynthetic insulating paper (PPLP: registered trademark, produced by Sumitomo Electric Industries, Ltd.). The insulating layer 45 was provided so as to have an insulating strength needed to insulate between the superconducting conductor layer 44 and the ground. The protecting layer 47 was provided on the outer circumference of the outer superconducting layer 46 by helically lapping insulating paper. Two cable cores 41 as described above were prepared. In addition, both cable cores 41 had the same diameter.

(Coolant-Circulating Pipe 42)

In this example, the coolant-circulating pipe 42 to be twisted together with the above-described two cable cores 41 was formed by a corrugated stainless steel pipe having the same diameter as that of the cores 41.

(Superconducting Cable 40)

The superconducting cable 40 was formed by twisting together two cable cores 41, each of which is provided with the foregoing superconducting conductor layer 44 and outer superconducting layer 46, and the coolant-circulating pipe 42 and then by housing the twisted body in the heat-insulated pipe 7. The two cores 41 were twisted together so as to have a slack so that they could have an allowance for contraction needed for thermal contraction when cooled by the coolant. As with Example 1, the slack was formed by placing a spacer (a sheet of felt having a thickness of 5 mm) between the cores 41 at the time of the twisting operation and then by removing the spacer at the time the twisted body was housed in the heat-insulated pipe 7. Because the coolant-circulating pipe 42 is formed by an expandable-and-contractible corrugated pipe, even when twisted together with the cores 41 without providing a slack, it can secure a sufficient allowance for contraction. In this example, the heat-insulated pipe 7 was formed of corrugated stainless steel pipe. As with the conventional superconducting cable shown in FIG. 7, the heat-insulated pipe 7 had a dual-pipe structure composed of an outer pipe 7a and an inner pipe 7b, between which a heat-insulating material (not shown) was placed in multiple layers. The space between the dual pipes was evacuated in vacuum. Thus, the heat-insulated pipe 7 had an evacuated multilayer heat-insulated structure. A space 8 enclosed by the inner pipe 7b, the two cable cores 41, and the coolant-circulating pipe 42 forms the outward channel for the coolant such as liquid nitrogen. The coolant-circulating pipe 42 functions as the return channel for the coolant. An anticorrosion covering (not shown) made of polyvinyl chloride was formed on the outer circumference of the heat-insulated pipe 7.

The superconducting cable 40 of the present invention having the above-described structure can be used for DC transmission, more specifically, whether bipolar transmission or unipolar transmission. First, the case where the unipolar transmission is performed is explained. To perform the unipolar transmission, it is recommendable to construct a transmission line as shown in FIG. 4. More specifically, one end of the superconducting conductor layer 44 provided in the core 41 at the right in FIG. 4 is connected to a DC-AC converter 13a, which is connected to an AC system (not shown), through a lead 50 and a lead 51. The other end of the same superconducting conductor layer 44 is connected to a DC-AC converter 13b, which is connected to an AC system (not shown), through a lead 52. Similarly, one end of the superconducting conductor layer 44 provided in the core 41 at the left in FIG. 4 is connected to the DC-AC converter 13a through a lead 53 and the lead 51. The other end of the same superconducting conductor layer 44 is connected to the DC-AC converter 13b through the lead 52. On the other hand, the outer superconducting layers 46 of both cores 41 are connected to the DC-AC converter 13a through a lead 54, a lead 55, and a lead 56 and are connected to the DC-AC converter 13b through a lead 57. In this example, the lead 56 is grounded. This grounding places the outer superconducting layers 46 at the ground potential. In this example, a single-end grounding is employed. Nevertheless, a both-end grounding may be employed by grounding the lead 57 also. The leads 50 to 57 electrically connect the superconducting conductor layers 44 and the outer superconducting layers 46 with the DC-AC converters 13a and 13b.

A DC transmission line provided with the foregoing configuration can be used to perform a unipolar transmission by using the superconducting conductor layers 44 provided in both cores 41 as the outward line, which carries the unipolar current, and by using the outer superconducting layers 46 provided in both cores 41 as the return line, which carries the return current. In addition, the superconducting cable 40 is formed by twisting together the two cable cores 41 having a slack and the coolant-circulating pipe 42 made of a expandable-and-contractible corrugated pipe. Consequently, both the slack and the expanding-and-contracting function can absorb the amount of thermal contraction at the time of the cooling. Furthermore, the superconducting cable 40 has a structure in which the coolant-circulating pipe 42 is provided in place of one core, in comparison with a superconducting cable that is formed by twisting together three cores each provided with the superconducting conductor and outer superconducting layer, each made of superconducting material. Therefore, the return channel of the coolant can be provided without decreasing the cross-sectional area of the space 8. In particular, because the coolant-circulating pipe 42 has the same diameter as that of the cable cores 41, the cable 40 can have a maximal cross-sectional area for the return channel of the coolant. In addition, the cable 40 can have the same diameter as that of a cable having a three-core-twisted structure. Consequently, the cable diameter is not increased.

Example 5

Next, the case where a bipolar transmission is performed is explained. FIG. 5(A) is a schematic configuration diagram showing a state in which a DC transmission line for bipolar transmission is constructed by using a superconducting cable of the present invention. FIG. 5 (B) is a schematic configuration diagram showing a state in which a DC transmission line for unipolar transmission is constructed by using the superconducting conductor layer and outer superconducting layer of one of the cores. The superconducting cable 40 used in Example 4 can also be used for bipolar transmission. To perform the bipolar transmission, it is recommendable to construct a transmission line as shown in FIG. 5(A). More specifically, one end of the superconducting conductor layer 44 provided in one of the cores 41 (in FIG. 5(A), the core 41 at the right) is connected to a DC-AC converter 14a, which is connected to an AC system (not shown), through a lead 60. The other end of the same superconducting conductor layer 44 is connected to a DC-AC converter 14b, which is connected to an AC system (not shown), through a lead 61. Similarly, one end of the outer superconducting layer 46 provided in the same core 41 is connected to the DC-AC converter 14a through a lead 62 and a lead 63. The other end of the same outer superconducting layer 46 is connected to the DC-AC converter 14b through a lead 64. On the other hand, one end of the superconducting conductor layer 44 provided in the other core 41 (in FIG. 5(A), the core 41 at the left) is connected to a DC-AC converter 15a, which is connected to an AC system (not shown), through a lead 65. The other end of the same superconducting conductor layer 44 is connected to a DC-AC converter 15b, which is connected to an AC system (not shown), through a lead 66. Similarly, one end of the outer superconducting layer 46 provided in the same core 41 is connected to the DC-AC converter 15a through a lead 67 and the lead 63. The other end of the same outer superconducting layer 46 is connected to the DC-AC converter 15b through the lead 64. The lead 63 is grounded. This grounding places the outer superconducting layers 46 of both cores 41 at the ground potential. In this example, a single-end grounding is employed by grounding only the lead 63. Nevertheless, a both-end grounding may be employed by grounding the lead 64 also. The leads 60 to 67 electrically connect the superconducting conductor layers 44 and the outer superconducting layers 46 with the DC-AC converters 14a, 14b, 15a, and 15b.

The above-described configuration makes up a positive-pole circuit in the forward direction composed of the DC-AC converter 14b, the lead 61, the superconducting conductor layer 44 of the core 41 at the right in FIG. 5(A), the lead 60, the DC-AC converter 14a, the lead 63, the lead 62, the outer superconducting layer 46 of the core 41 at the right, and the lead 64. On the other hand, the configuration also makes up a negative-pole circuit in the forward direction composed of the DC-AC converter 15b, the lead 66, the superconducting conductor layer 44 of the core 41 at the left in FIG. 5(A), the lead 65, the DC-AC converter 15a, the lead 63, the lead 67, the outer superconducting layer 46 of the core 41 at the left, and the lead 64. The positive- and negative-pole circuits shown in the forward direction in the above enable the performing of the bipolar transmission. In this configuration, the outer superconducting layers 46 of both cores 41 are used not only as the neutral line but also to circulate an imbalanced current between the positive and negative poles or an abnormal current. In this example, in FIG. 5(A), the core at the right is used for the positive pole and the core at the left for the negative pole. Nevertheless, the usage may be reversed, of course.

Even when one of the poles stops the power transmission using its superconducting conductor layer due to an abnormality in the superconducting conductor layer or DC-AC converter for the pole, a unipolar transmission can be performed by using the superconducting conductor layer and outer superconducting layer for the sound pole. For example, in FIG. 5(A), when the core 41 at the left, the DC-AC converters 15a and 15b, or the like creates an abnormal condition, i.e., when the negative pole creates an abnormal condition, the transmission using the core 41 at the left in FIG. 5(A) is stopped. In this case, as shown in FIG. 5(B), a transmission line for a unipolar transmission is formed by using the other core 41 (in FIG. 5 (A), the core 41 at the right). More specifically, the unipolar transmission can be performed by using the superconducting conductor layer 44 of the core 41 as the outward line and using the outer superconducting layer 46 of the same core as the return line. In this example, the case where the negative pole creates an abnormality is explained. Nevertheless, when the positive pole creates an abnormality, also, a similar step can be taken. In this case, the unipolar transmission can be performed by using the superconducting conductor layer 44 of the other core 41 (in FIG. 5 (A), the core 41 at the left) as the outward line and using the outer superconducting layer 46 of the same core as the return line.

As explained above, a superconducting cable of the present invention can be used for both the bipolar transmission and unipolar transmission. In particular, the cable is designed so as to have two cable cores and one coolant-circulating pipe. Therefore, in comparison with a structure having three cable cores, the quantity of the superconducting material used for the entire cable can be decreased, and the twisted structure can be formed more easily.

As described earlier, for performing DC transmission, as with the above-described Example 2, the insulating layer 45 of the core 41 may be structured with the $\rho$ grading to flatten the distribution of the DC electric field thicknesswise in the insulating layer. In addition, the insulating layer 45 may be provided with a high $\in$ layer in the vicinity of the superconducting conductor layer 44 to improve the DC voltage-withstanding property and impulse voltage-withstanding property. Furthermore, in addition to the above-described $\rho$ grading, as with the above-described Example 2, the insulating layer 45 may be structured with the $\in$ grading so as to have an excellent AC property. When this improvement is achieved, the superconducting cable 40 can be suitably used not only for DC transmission but also for AC transmission. For example, by using different groups of PPLP (registered trademark), the different groups each having a different ratio, k, as follows, an insulating layer can be formed that has three different steps of resistivity and dielectric constant. It is recommended that the following three layers be provided in the following order from inside (X and Y each represent a constant):

A low $\rho$ layer: ratio (k): 60%, resistivity ($\rho$) (at 20° C.): X $\Omega \cdot$cm, dielectric constant ($\in$): Y;

A middle $\rho$ layer: ratio (k): 70%, resistivity ($\rho$) (at 20° C.): about 1.2X $\Omega \cdot$cm, dielectric constant ($\in$): about 0.95Y; and A high $\rho$ layer: ratio (k): 80%, resistivity ($\rho$) (at 20° C.): about 1.4X $\Omega \cdot$cm, dielectric constant ($\in$): about 0.9Y.

When the superconducting cable 40 is used for performing three-phase AC transmission, it is recommendable to use two or three superconducting cables 40. When two cables 40 are used, it is recommended that of four cores 41 of the two cables 40, one core 41 be used as the spare core, the superconducting conductor layers 44 of the remaining three cores 41 be used for the transmission for the individual phases, and the outer superconducting layers 46 of these three cores 41 be used as the shield layers. When three cables 40 are used, the individual cables 40 are used for the transmission for the individual phases. More specifically, the two cores 41 provided in each cable 40 are used for the transmission for one phase. In this case, the superconducting conductor layers 44 of the two cores 41 provided in each cable 40 are used for the transmission for the corresponding phase, and the outer superconducting layers 46 provided at the outer side of these superconducting conductor layers 44 are used as the shield layers. When the superconducting cable 40 is used for performing single-phase AC transmission, it is recommendable to prepare one superconducting cable 40, to use the superconducting conductor layers 44 of the individual cores 41 for the transmission for the same phase, and to use the outer superconducting layers 46 provided at the outer side of these superconducting conductor layers 44 as the shield layers.

The superconducting cable 40 can be used for performing DC transmission, such as the above-described unipolar transmission and bipolar transmission, after being used for performing the above-described AC transmission. As described above, a superconducting cable of the present invention having an insulating layer structured by the $\rho$ grading and $\in$ grading can be suitably used as a DC/AC cable. The matter concerning the $\rho$ grading and $\in$ grading is also applied to the below-described Example 6.

Next, an explanation is given to another structure of the superconducting cable of the present invention that is formed by twisting together two cable cores and one coolant-circulating pipe. FIG. 6 is a schematic cross-sectional view showing an example in which the coolant-circulating pipe is provided with a protecting layer on its outer circumference.

Example 6

In the structures shown in Examples 4 and 5, when the assembled body formed by twisting together two cable cores 41 and the coolant-circulating pipe 42 is inserted into the heat-insulated pipe (see FIG. 4 and FIGS. 5(A) and (B)), the outer circumferential surface of the coolant-circulating pipe 42 may be brought into physical contact with the inner circumferential surface of the heat-insulated pipe (inner pipe). When this occurs, metallic powders may be produced, or the coolant-circulating pipe 42 or the heat-insulated pipe may be damaged. To solve this problem, as shown in FIG. 6, a protecting layer 42b may be provided on the outer circumference of the coolant-circulating pipe 42a to prevent it from being brought into contact with the heat-insulated pipe. In this example, the protecting layer 42b was formed by helically lapping kraft paper. In addition, in this example, the diameter of the coolant-circulating pipe 42a was selected so that the provided protecting layer 42b had the same diameter as that of the cable cores 41. This structure eliminates the contact between the coolant-circulating pipe 42a and the heat-insulated pipe, thereby enabling the prevention of the problems caused by the contact.

INDUSTRIAL APPLICABILITY

A superconducting cable of the present invention is suitable for use for an electrical line for performing power transmission. In particular, a superconducting cable of the present invention can be used suitably not only for a means of transmitting DC power but also for transmitting AC power in a transient period in which the transmission system is switched from AC to DC. Furthermore, a DC transmission system of the present invention can be used suitably at the time the DC transmission is performed by using the above-described superconducting cable of the present invention.

EXPLANATION OF THE SIGN

Figure 1:
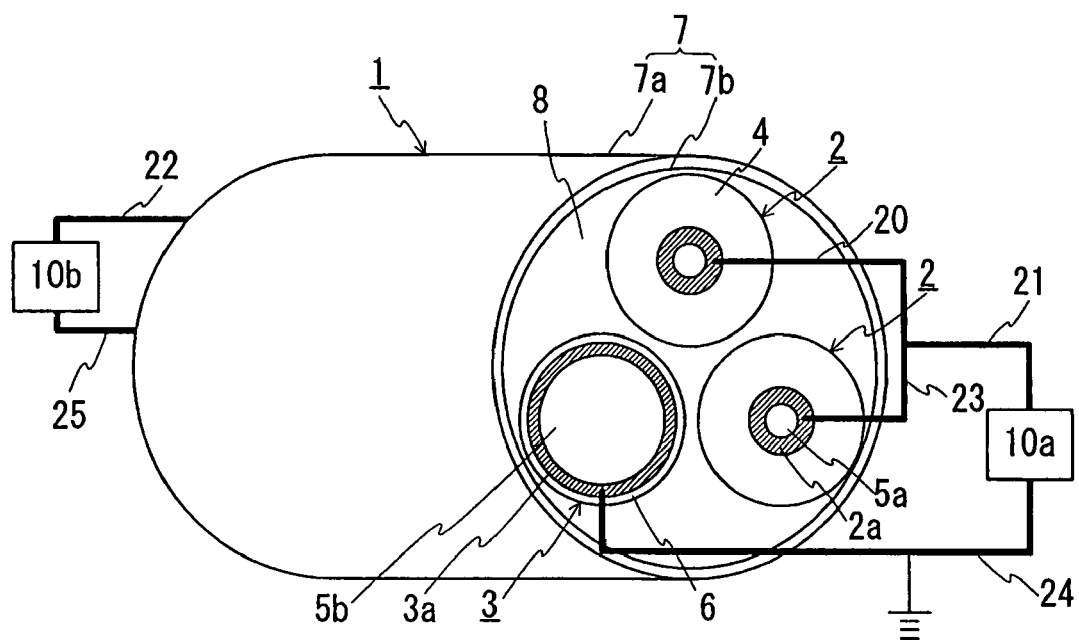
FIG. 1 is a schematic configuration diagram showing a state in which a DC transmission line for unipolar transmission is constructed by using a superconducting cable of the present invention formed by twisting together the first and second cores.
Figure 2A:
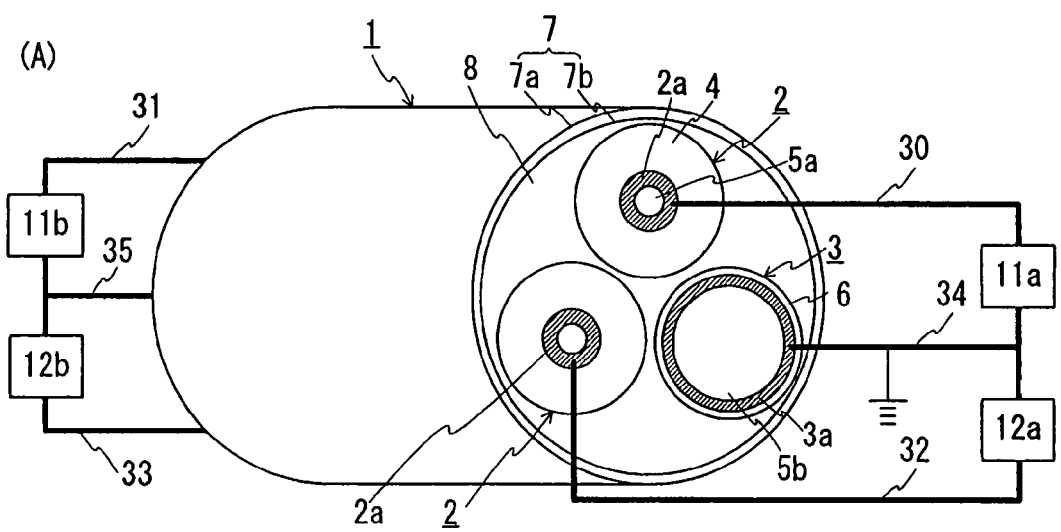
FIG. 2(A) is a schematic configuration diagram showing a state in which a DC transmission line for bipolar transmission is constructed by using a superconducting cable of the present invention formed by twisting together the first and second cores, and FIG. 2 (B) is a schematic configuration diagram showing a state in which a DC transmission line for unipolar transmission is constructed by using the first superconducting layer of one of the first cores and the second superconducting layer of the second core in the same superconducting cable as above.
Figure 2B:
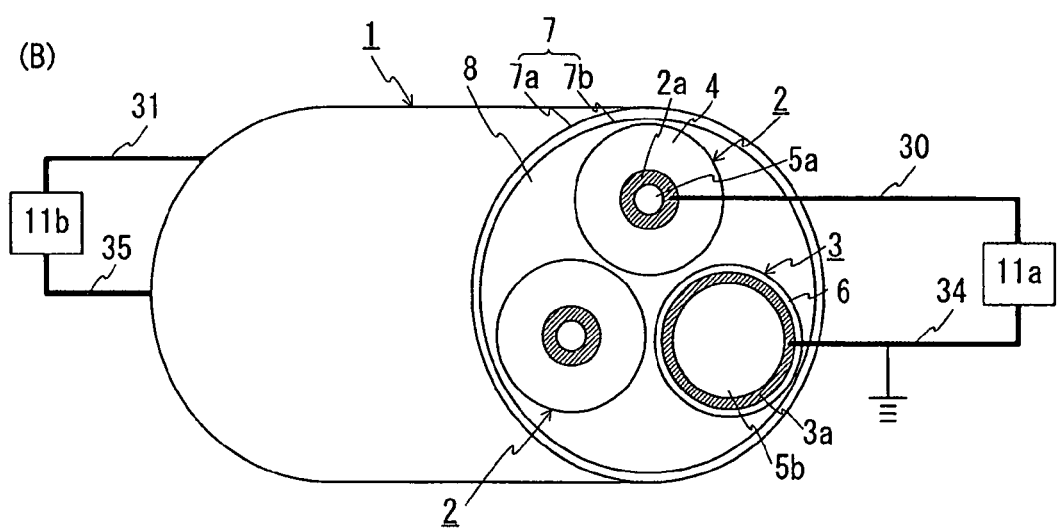
Figure 3:
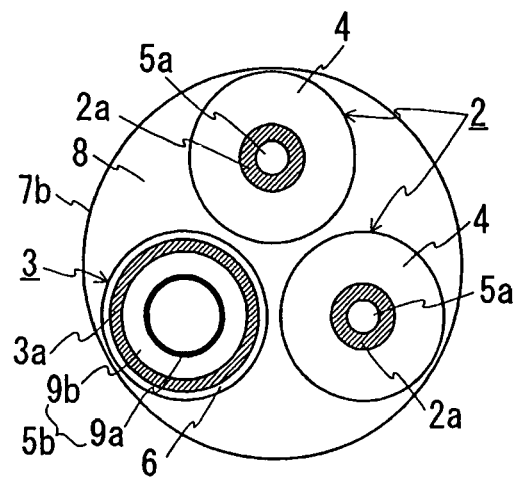
FIG. 3 is a schematic cross-sectional view showing an example in which in a superconducting cable of the present invention formed by twisting together the first and second cores, the second core is provided with a coolant-circulating pipe at the inside of the second superconducting layer.
Figure 4:
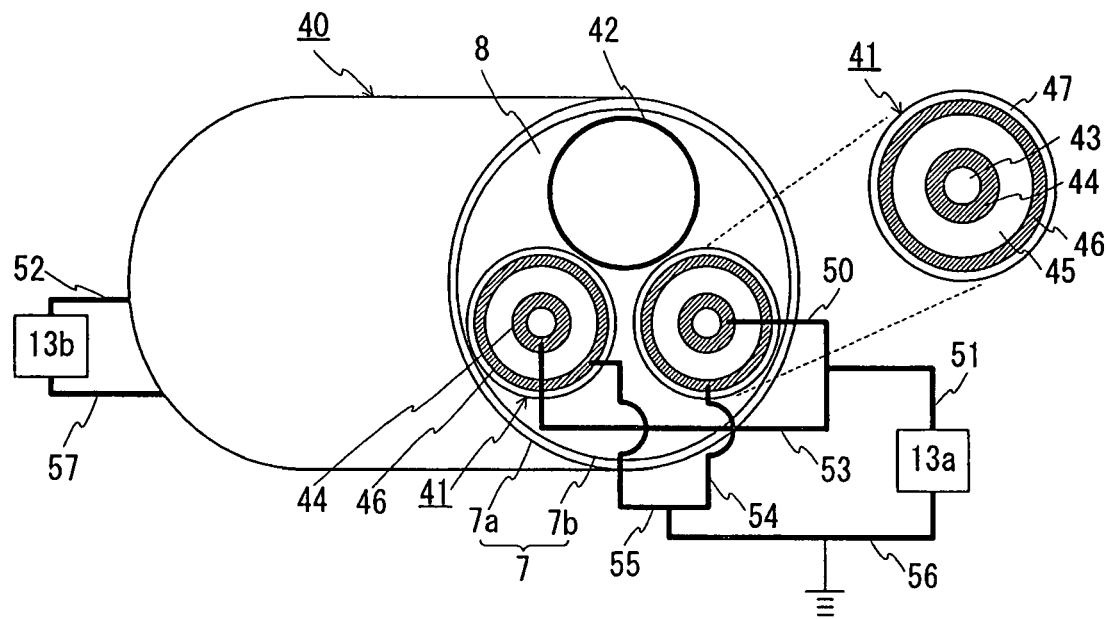
FIG. 4 is a schematic configuration diagram showing a state in which a DC transmission line for unipolar transmission is constructed by using a superconducting cable of the present invention formed by twisting together two cores and one coolant-circulating pipe.
Figure 5A:
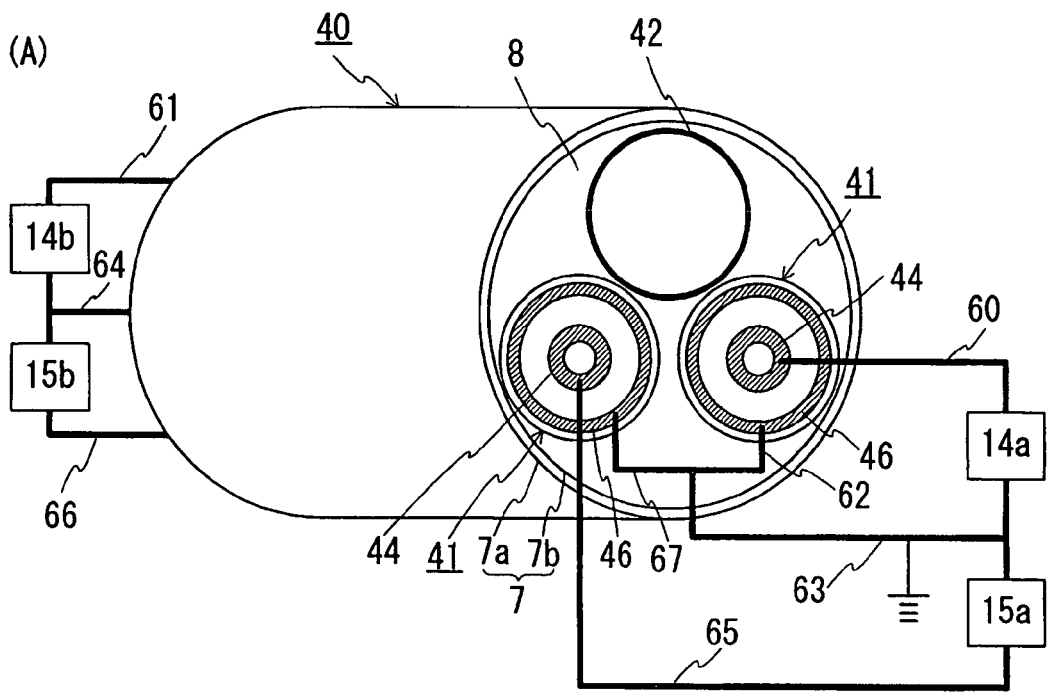
FIG. 5(A) is a schematic configuration diagram showing a state in which a DC transmission line for bipolar transmission is constructed by using a superconducting cable of the present invention formed by twisting together two cores and one coolant-circulating pipe, and FIG. 5 (B) is a schematic configuration diagram showing a state in which a DC transmission line for unipolar transmission is constructed by using the superconducting conductor layer and outer superconducting layer of one of the cores in the same superconducting cable as above.
Figure 5B:
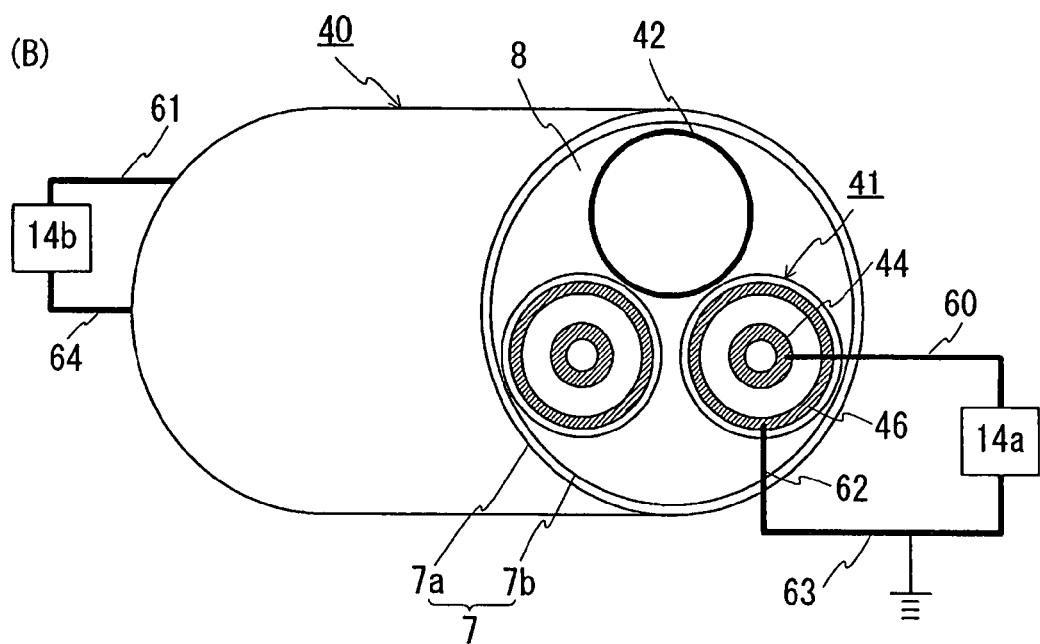
Figure 6:
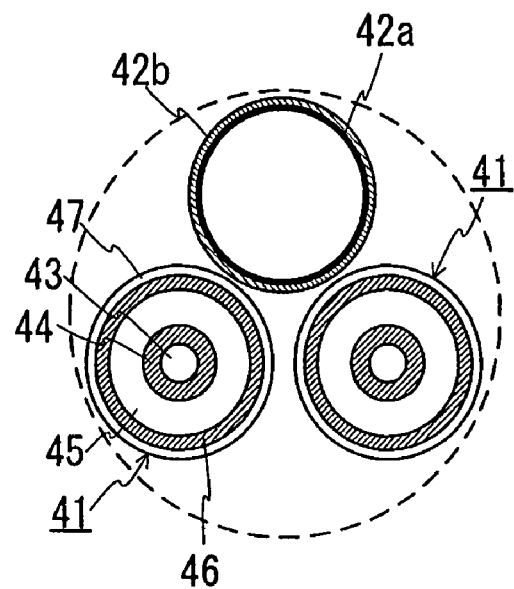
FIG. 6 is a schematic cross-sectional view showing another structure of a superconducting cable of the present invention formed by twisting together two cores and one coolant-circulating pipe, the structure being formed by providing a protecting layer on the outer circumference of the coolant-circulating pipe.
Figure 7:
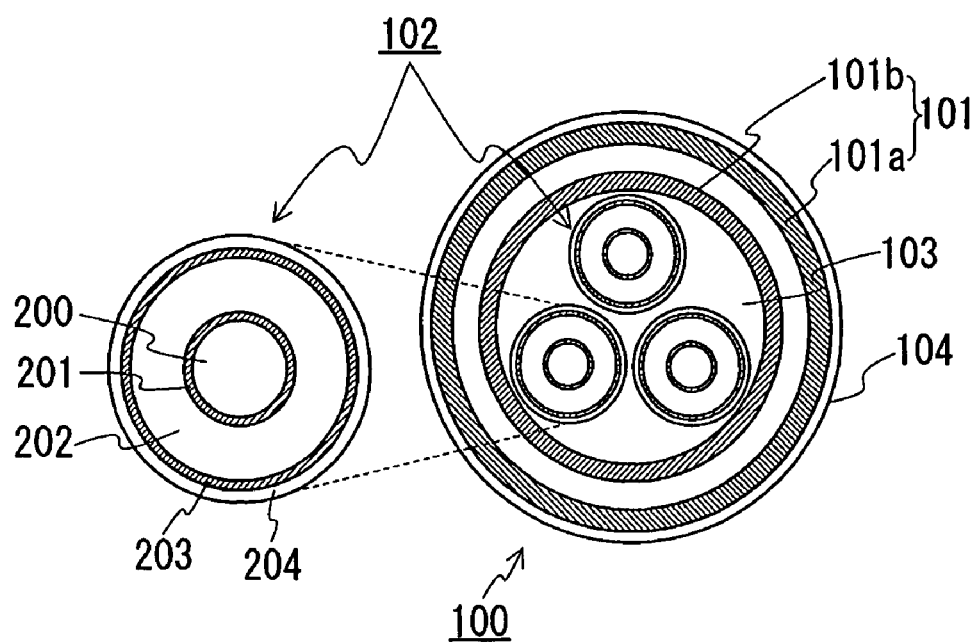
FIG. 7 is a cross-sectional view of a three-core-twisted-type superconducting cable for the three-phase AC use.

1 and 40: Superconducting cable; 2: First core; 2a: First superconducting layer; 3: Second core; 3a: Second superconducting layer; 4, 6, and 9b: Insulating layer; 5a: Former; 5b: Core member; 7: Heat-insulated pipe; 7a: Outer pipe; 7b: Inner pipe; 8: Space; 9a: Coolant-circulating pipe; 10a, 10b, 11a, 11b, 12a, 12b, 13a, 13b, 14a, 14b, 15a, and 15b: DC-AC converter; 20 to 25, 30 to 35, 50 to 57, and 60 to 67: Lead; 41: Cable core; 42 and 42a: Coolant-circulating pipe; 42b: Protecting layer; 43: Former; 44: Superconducting conductor layer; 45: Insulating layer; 46: Outer superconducting layer; 47: Protecting layer; 100: Superconducting cable for three-phase AC use; 101: Heat-insulated pipe; 101a: Outer pipe; 101b: Inner pipe; 102: Cable core; 103: Space; 104: Anticorrosion covering; 200: Former; 201: Superconducting conductor layer; 202: Insulating layer; 203: Superconducting shield layer; 204: Protecting layer.

The invention claimed is:

1. A superconducting cable including a plurality of cable cores that are twisted together, each cable core having a superconducting layer and an insulating layer; the superconducting cable comprising:
   (a) a first core having a first superconducting layer; and
   (b) a second core having a second superconducting layer that has an inner diameter larger than the outer diameter of the first superconducting layer,
   wherein the first and second superconducting layers each include helically wound tape-shaped wires having a structure in which a plurality of filaments made of a superconducting material are configured in a matrix such as a silver sheath,
   wherein the first core includes no additional superconducting layer made of a superconducting material other than the first superconducting layer, and
   wherein the second core includes no additional superconducting layer made of a superconducting material other than the second superconducting layer.

2. A superconducting cable as defined by claim 1, wherein the second core has a coolant-circulating pipe at the inside of the second superconducting layer.

3. A superconducting cable as defined by claim 2, wherein the coolant-circulating pipe is any one of a metallic pipe, a spiral steel tape, and a corrugated metallic pipe.

4. A superconducting cable as defined by claim 1, the superconducting cable being formed by twisting two first cores and one second core together.

5. A superconducting cable as defined by claim 1, wherein the first core has the same diameter as that of the second core.

6. A superconducting cable as defined by claim 1, the superconducting cable having a core-twisted structure that has an allowance for contraction at the time the cable is cooled.

7. A superconducting cable as defined by claim 1, wherein in order to flatten the radial distribution of a DC electric field in the insulating layer, the insulating layer is structured by using a $\rho$ grading such that as the radial position moves toward the innermost portion of the insulating layer, the resistivity decreases, and as the radial position moves toward the outermost portion, the resistivity increases.

8. A superconducting cable as defined by claim 7, wherein the insulating layer has, in the vicinity of the superconducting layer, a high $\in$ layer that has a dielectric constant higher than that of the other portion.

9. A superconducting cable as defined by claim 7, wherein the insulating layer is structured such that as its radial position moves toward the innermost portion, the dielectric constant, $\in$, increases, and as the radial position moves toward the outermost portion, the dielectric constant, $\in$, decreases.

10. A DC transmission system incorporating a superconducting cable as defined by claim 1, the DC transmission system performing a unipolar transmission by using:
    (a) the first superconducting layer provided in the first core as an outward line; and
    (b) the second superconducting layer provided in the second core as a return line.

11. A DC transmission system incorporating a superconducting cable as defined by claim 1, the DC transmission system performing a bipolar transmission by the specification of:
    (a) providing the superconducting cable with a plurality of first cores;
    (b) using the first superconducting layer provided in at least one first core to perform the transmission for one pole selected from the group consisting of the positive pole and the negative pole;
    (c) using the first superconducting layer provided in the remaining at least one first core to perform the transmission for the other pole; and
    (d) using the second superconducting layer provided in the second core as the neutral line.

12. A superconducting cable including a plurality of cable cores that are twisted together including two cable cores and one coolant-circulating pipe twisted together; each of the two cable cores comprising:
    (a) a superconducting conductor layer;
    (b) an insulating layer provided on the outer circumference of the superconducting conductor layer; and
    (c) an outer superconducting layer provided on the outer circumference of the insulating layer; the coolant-circulating pipe having the same diameter as that of the cable cores, wherein each superconducting conductor layer includes helically wound tape-shaped wires having a structure in which a plurality of filaments made of a superconducting material are configured in a matrix such as a silver sheath, and wherein one of the two cable cores or the one coolant-circulating pipe is configured so as to include no superconducting material, thereby facilitating the twisting operation of the overall superconducting cable arrangement.

13. A superconducting cable as defined by claim 12, the superconducting cable having a two-core-twisted structure that has an allowance for contraction when the cable is cooled.

14. A superconducting cable as defined by claim 12, wherein the coolant-circulating pipe:
   (a) has an expanding-and-contracting property that allows the coolant-circulating pipe to contract at the time the cable is cooled; and
   (b) is twisted together with the two cores without having a slack for contracting at the time the cable is cooled.

15. A superconducting cable as defined by claim 14, wherein the coolant-circulating pipe is a corrugated metallic pipe.

16. A superconducting cable as defined by claim 12, wherein the coolant-circulating pipe is provided with a protecting layer on its outer circumference.

17. A superconducting cable as defined by claim 12, wherein in order to flatten the radial distribution of a DC electric field in the insulating layer, the insulating layer is structured by using a $\rho$ grading such that as the radial position moves toward the innermost portion of the insulating layer, the resistivity decreases, and as the radial position moves toward the outermost portion, the resistivity increases.

18. A superconducting cable as defined by claim 17, wherein the insulating layer has, in the vicinity of the superconducting conductor layer, a high $\in$ layer that has a dielectric constant higher than that of the other portion.

19. A superconducting cable as defined by claim 17, wherein the insulating layer is structured such that as its radial position moves toward the innermost portion, the dielectric constant, $\in$, increases, and as the radial position moves toward the outermost portion, the dielectric constant, $\in$, decreases.

20. A DC transmission system incorporating a superconducting cable as defined by claim 12, the DC transmission system performing a unipolar transmission by using:
   (a) the superconducting conductor layers provided in both cores as an outward line; and
   (b) the outer superconducting layers provided in both cores as a return line.

21. A DC transmission system incorporating a superconducting cable as defined by claim 12, the DC transmission system performing a bipolar transmission by using:
   (a) the superconducting conductor layer provided in one of the two cores to perform the transmission for one pole selected from the group consisting of the positive pole and the negative pole;
   (b) the superconducting conductor layer provided in the other core to perform the transmission for the other pole; and
   (c) the outer superconducting layer provided in each of the two cores as the neutral line.

* * * * *